United States Patent
Demir et al.

(10) Patent No.: US 10,585,311 B2
(45) Date of Patent: Mar. 10, 2020

(54) DISPLAY DEVICE

(71) Applicants: Vestel Elektronik Sanayi ve Ticaret A.S., Manisa (TR); Hilmi Volkan Demir, Ankara (TR); Emre Ünal, Ankara (TR); Özgün Akyüz, Ankara (TR)

(72) Inventors: Hilmi Volkan Demir, Ankara (TR); Emre Ünal, Ankara (TR); Özgün Akyüz, Ankara (TR); Sedat Şengül, Manisa (TR); Kivanç Karsli, Manisa (TR); Devrim Köseoğlu, Manisa (TR)

(73) Assignees: Vestel Elektronik Sanayi ve Ticaret A.S., Manisa (TR); Hilmi Volkan Demir, Ankara (TR); Emre Ünal, Ankara (TR); Özgün Akyüz, Ankara (TR)

( * ) Notice: Subject to any disclaimer, the term of this patent is extended or adjusted under 35 U.S.C. 154(b) by 0 days.

(21) Appl. No.: 16/281,386

(22) Filed: Feb. 21, 2019

(65) Prior Publication Data
US 2019/0258116 A1    Aug. 22, 2019

(30) Foreign Application Priority Data

Feb. 22, 2018  (EP) ...................... 18158239
Feb. 22, 2018  (TR) .................. 2018/02490

(51) Int. Cl.
*F21V 33/00*    (2006.01)
*G02F 1/1335*   (2006.01)

(52) U.S. Cl.
CPC .. *G02F 1/133617* (2013.01); *G02F 1/133514* (2013.01); *G02F 2001/133614* (2013.01); *G02F 2203/05* (2013.01)

(58) Field of Classification Search
None
See application file for complete search history.

(56) References Cited

U.S. PATENT DOCUMENTS

| | | |
|---|---|---|
| 6,818,328 B2 | 11/2004 | Utsumi et al. |
| 9,170,453 B2 | 10/2015 | Shin et al. |
| 2012/0287381 A1 | 11/2012 | Li et al. |
| 2013/0128548 A1 | 5/2013 | Lin |
| 2017/0102588 A1 | 4/2017 | Im et al. |

FOREIGN PATENT DOCUMENTS

| | | |
|---|---|---|
| CN | 105611681 A | 5/2016 |
| KR | 20140042274 A | 4/2014 |

OTHER PUBLICATIONS

Oh et al: Highly efficient full-color display based on blue LED backlight and electrochromic light-valve coupled with front-emitting phosphors. Optics Express, vol. 19, No. 17, Aug. 15, 2011, pp. 16022-16031.
Kim et al: Optimal Design of Quantum Dot Color Conversion Film in LCD Backlighting. IEEE, Dec. 1, 2016, pp. 1-5.
European Extended search report dated Jun. 22, 2018 for EP Application No. 18158239.6.

*Primary Examiner* — Vip Patel
(74) *Attorney, Agent, or Firm* — EIP US LLP (57) ABSTRACT

A display device comprising a light source configured to output light of a first wavelength. The display device has a plurality of display elements comprising a first display element and a second display element. A first photoluminescent material associated with the first display element is located at a first side of a first substrate; and a second photoluminescent material associated with the second display element is located at a second side of the first substrate.

20 Claims, 7 Drawing Sheets

| | | | | | | | |
|---|---|---|---|---|---|---|---|
| | G | G | G | G | G | G | G |
| | | | | | | | |
| | G | G | G | G | G | G | G |
| | | | | | | | |
| | G | G | G | G | G | G | G |
| | | | | | | | |
| | G | G | G | G | G | G | G |
| | | | | | | | |

*FIG. 3*

| R | R | R | R | R | R | R |
|---|---|---|---|---|---|---|
| | | | | | | |
| R | R | R | R | R | R | R |
| | | | | | | |
| R | R | R | R | R | R | R |
| | | | | | | |
| R | R | R | R | R | R | R |
| | | | | | | |

DISPLAY DEVICE

CROSS-REFERENCE TO RELATED APPLICATIONS

This application claims priority to Turkish Application No. 2018/02490, filed Feb. 22, 2018, and EP Application No. 18158239.6, filed Feb. 22, 2018, under 35 U.S.C. § 119(a). Each of the above-referenced patent applications is incorporated by reference in its entirety.

BACKGROUND OF THE INVENTION

A so-called liquid crystal display (LCD) is known to use a backlight. The brightness of a sub-pixel may for example be controlled by selecting an orientation of a liquid crystal material, which in turn determines the transmissivity of the liquid crystal material for light from the backlight.

In a pixel with red, green and blue sub-pixels, each sub-pixel may have a corresponding colour filter, for example a red, green and blue colour filter. However, for each sub-pixel, this approach can result in a significant loss of light between the light output by the backlight and the light output from the colour filter.

It is known to use luminescent materials in a display device to output light, possibly in conjunction with a backlight. Such display devices are often complex in design and manufacture, requiring for example careful selection of different luminescent materials which are compatible with each other and which also output the required sub-pixel colours.

It is desirable to simplify a display device.

DETAILED DESCRIPTION

Examples are described herein of a display device which uses photoluminescent material to improve the efficiency of using light output by a light source. A different photoluminescent material may be used for one or more different display elements, and in some examples the same light source is used for each display element. This improves the efficiency of using light output by the light source, compared with known systems which use a non-photoluminescent colour filter.

In examples, rather than use a two or more photoluminescent layers stacked on top of each other for one or more display elements, which can require careful selection of compatible photoluminescent materials, each display element may have a different photoluminescent material chosen according to the colour of light required to be output by that display element. This improves the design freedom for designing a display device with a desired display gamut, whilst still being able to benefit from the improved light efficiency by using photoluminescent materials.

In further examples, each different photoluminescent material may be patterned on a different substrate. For example, a first photoluminescent material may be patterned on a first substrate, a second photoluminescent material may be patterned on a second substrate and in some examples a third photoluminescent material may be patterned on a third substrate. These substrates can be stacked to give a structure for outputting the required colour of each display element. Compared with known systems, this technique offers a versatile and simple approach for design and manufacture of a colour output of a display device, as different substrates with the appropriate photoluminescent material patterned thereon can be simply selected and stacked according to the type of display device and colour gamut required. Although multiple substrates are required, this approach is simpler compared with devices where different photoluminescent materials are deposited on the same substrate, which can require a more specialised and complex manufacture technique compatible with all the different photoluminescent materials.

Detailed examples will now be described with reference to the Figures.

In such examples, one or more photoluminescent materials are referred to. A photoluminescent material is typically a material which emits light in response to receipt of input light. Such a material may therefore be considered to be photoexcitable, as, in response to the absorption of input energy in the form of photons, the material is changed to an excited state, and then relaxes to a less excited state which causes photons to be output. For example, such a material may receive light of a given wavelength or wavelengths, and in response output light of a different wavelength or wavelengths. Often the input light is of a shorter wavelength than the output light. A photoluminescent material may be considered to be a so-called colour conversion material, as output light is of a different wavelength than input light.

In such examples, a display device with a plurality of display elements is referred to. A display element is for example an independently controllable element to output light of a given colour and with a selected brightness. Commonly, there is a plurality of display elements, which may be arranged in an ordered manner, for example as a matrix of columns and rows as the skilled person will appreciate. By controlling each display element, an image may be output by the plurality of display elements for a viewer to perceive. In some examples, where the display device is for outputting monochrome images, each display element may be considered a pixel. In other examples, where the display device is for outputting so-called full colour images, each display element may be considered a sub-pixel. The display elements are arranged such that groups of sub-pixels of different colours can operate together as a pixel, with appropriate control of the colour and brightness output of each sub-pixel of the pixel, so that the pixel outputs light of a given colour and with a selected brightness.

Figure 1:
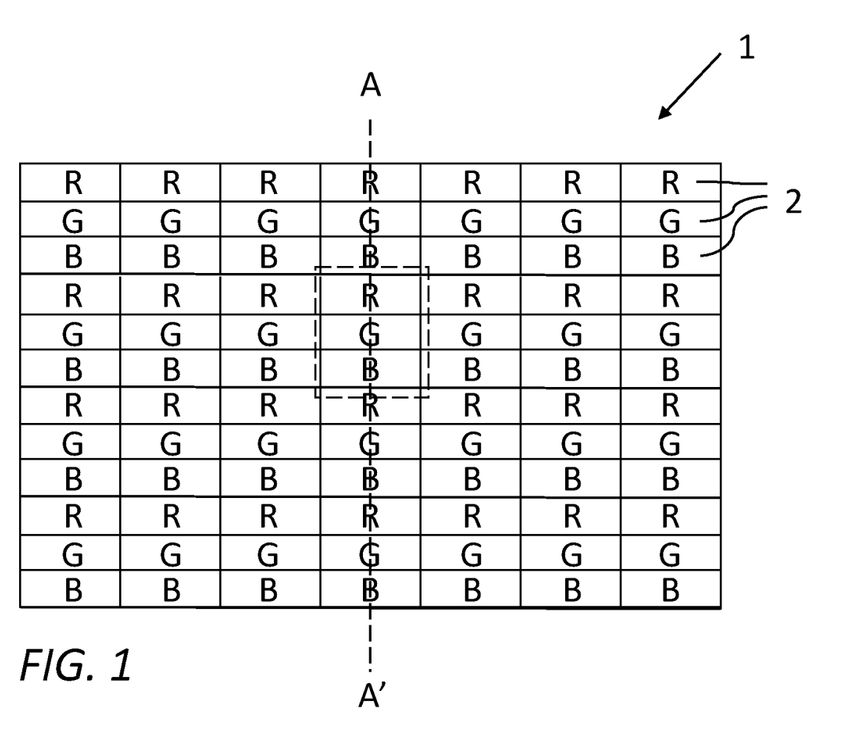
FIG. 1 shows schematically a plan view of a plurality of display elements, according to examples.

FIG. 1 shows schematically in plan view an array 1 of display elements 2 of a display device according to various examples described herein. Each display element is either for outputting red, green or blue light, as indicated respectively with the R, G, B labels. It is to be appreciated that the number of rows and columns of display elements shown is arbitrary, and that further examples are envisaged with greater or fewer display elements, possibly arranged differently than a matrix of rows and columns.

Figure 2:
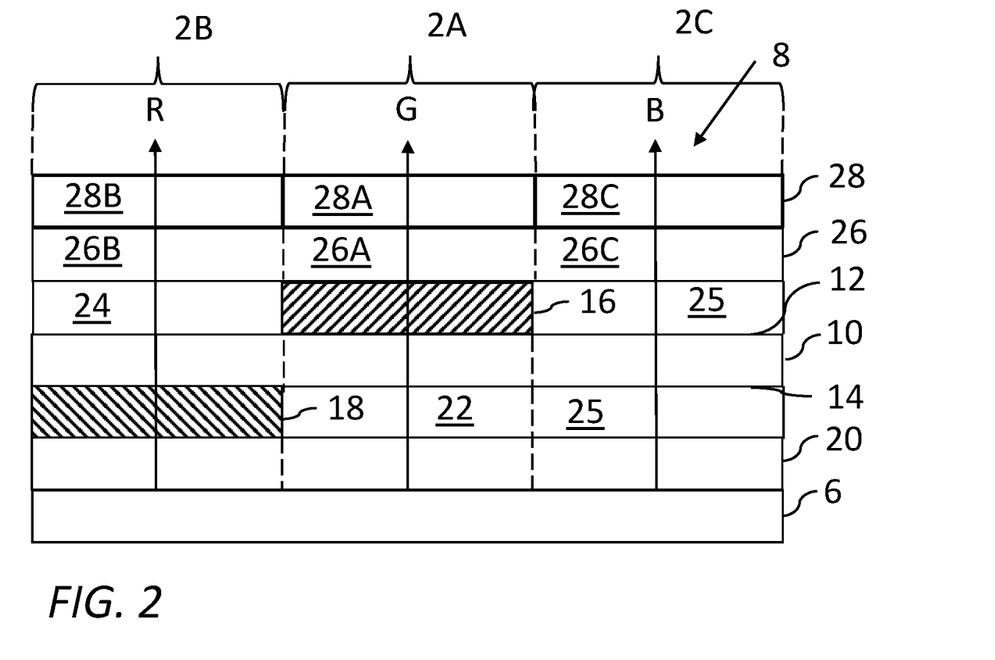
FIG. 2 shows schematically a cross-section of three of the display elements.

FIG. 2 shows schematically a cross-section of the three display elements of FIG. 1 indicated with the dashed box. The cross-section is taken along the plane A-A' shown in FIG. 1. The lateral extent of a first display element 2A, a second display element 2B and a third display element 2C are illustrated with the brackets and dashed lines.

In the examples of FIG. 2, there is a light source 6. The light source is configured to output light of a first wavelength, for example of a first wavelength range. The light may be generated by a light emitting diode (LED) or other electrically controlled light generator, as the skilled will understand. The light source may in these examples be considered a backlight, due to its positioning away from a viewing side 8 of the display device, and may be appropriately optically configured to direct the light towards the viewing side. In other examples, the light source may be positioned along an edge of the array of display elements, with a light guide configured to redirect light from the light source towards the viewing side.

There is a first substrate 10 having a first side 12 and a second side 14. The second side is closer to the light source than the first side, and is an opposite side of the first substrate than the second side. A substrate is typically a support element, for example a plate or layer, which may give structural support to a part of the device thereon.

A first photoluminescent material 16 is associated with the first display element 2A and is located at the first side of the first substrate. By being associated with the first display element, the first photoluminescent material is at least substantially within the lateral extent of the first display element, indicated by dashed lines, for example within acceptable manufacturing and operational tolerances. For example, the first photoluminescent material may not sufficiently encroach within the lateral extent of an adjacent display element to sufficiently negatively affect operation of the adjacent display element. In examples where each display element comprises an individual light valve or a light source, the first photoluminescent material being associated with the first display element is substantially overlapping with the light valve or light source, such that the lateral extent of the first photoluminescent material is aligned with the lateral extent of the light valve or light source within acceptable manufacturing and operational tolerances.

The first photoluminescent material is in these examples a layer comprising the first photoluminescent material, with a substantially uniform thickness, for example a uniform thickness within acceptable manufacturing tolerances. In other examples, the first photoluminescent material may instead of such a layer be provided as a pattern of droplets or other portions of the first photoluminescent material.

With the first photoluminescent material located at the first side of the substrate, the first photoluminescent material is closer to the first side 12 than to the second side 14. As in the examples shown, the first photoluminescent material is in contact with the first side 12. In other examples it is envisaged that there may be at least one further structure, such as another functional layer in a stack of layers of the display device, between the first substrate and the first photoluminescent material. In either case, the first photoluminescent material can be considered to be located on the first substrate.

A second photoluminescent material 18 is associated with the second display element 2B and is located at the second side of the first substrate. The explanation of the first photoluminescent material being associated with the first display element given above applies similarly here for the second photoluminescent material being associated with the second display element.

The second photoluminescent material 18 in these examples is a layer comprising the second photoluminescent material, with a substantially uniform thickness, similar to that explained above for the first photoluminescent material. In other examples the second photoluminescent material may instead be for example a pattern of droplets or other portions of the second photoluminescent material.

With the second photoluminescent material 18 located at the second side of the first substrate, the second photoluminescent material is located closer to the second side 14 of the first substrate than the first side 12. Similarly as described above for the first photoluminescent material, as in the examples shown, the second photoluminescent material is in contact with the second side, but in other examples there may be another structure between the second photoluminescent material and the first substrate.

In examples such as those described using FIG. 2, the first photoluminescent material and the second photoluminescent material may be considered to be substantially non-overlapping with each other. Thus, with the first and second display elements being adjacent display elements, without another display element between them, the first photoluminescent material and the second photoluminescent material may not overlap, for example one may not partly or entirely cover the other, such that transmission of light output by one of the photoluminescent materials (in this case the second photoluminescent material) is not blocked or restricted by the other of the photoluminescent materials (in this case the first photoluminescent material), to the extent of having a negative effect on the operation of either of the display elements. In some examples, a lateral extent of the first photoluminescent material and of the second photoluminescent material may be aligned within acceptable tolerances with the lateral extent of their respective display element.

It is envisaged that the display device may comprise the first substrate with the first photoluminescent material on the first side 12 and the second photoluminescent material on the second side 14, as described above, without any further substrate between the second photoluminescent material and the light source. However, in other examples, as shown with FIG. 2, there is a second substrate 20 on which the second photoluminescent material is located. The second substrate may be similar in construction and composition as the first substrate.

For either or each of the first and second display elements, there may be an absence of photoluminescent material on one side of the first substrate and/or one side of the second substrate. For example, as shown in FIG. 2, for the first display element, there is an absence of photoluminescent material between the first substrate and the second substrate, and, for the second display element, there is an absence of photoluminescent material at the first side of first substrate. Therefore, the first display element comprises an absence of photoluminescent material at the second side of the first substrate and/or the second display element comprises an absence of photoluminescent material at the first side of the first substrate. In such a region where there is an absence of photoluminescent material, for example where there is a lack of, or the region is free from, photoluminescent material, there may be either a gas such as air, or a layer or other pattern of solid material, for example a filler material, transmissive to light output by either the light source or the photoluminescent material of the appropriate display element. For example, for the first display element 2A, there may be a transmissive material 22 which is transmissive to light output by the light source. For the second display element 2B, there may be a transmissive material 24 which is transmissive to light output by the second photoluminescent material.

For the third display element 2C, which for example is adjacent the first display element with no display element therebetween, and which is according to examples described using FIG. 2, there is an absence of photoluminescent material between the light source and the viewing side 8. In other words the third display element may substantially comprise no photoluminescent material, other than possibly some photoluminescent material from an adjacent display element due to tolerable manufacturing inaccuracies, and which do not have a sufficiently negative effect on the performance of the third display element. In such examples, the light output by the light source 6 is suitable for the light to be output by the third display element.

For the third display element, where there is such an absence of photoluminescent material there may be, in a similar manner as for the first and second display elements described above, a gas or a transmissive material 25 (which is for example a solid) for light output by the light source. As will be appreciated, if there is such an absence of photoluminescent material for adjacent display elements, the gas or transmissive material may extend between the adjacent display elements, for example between the first and second substrates for the first and third display elements as illustrated in FIG. 2.

In examples such as those described with FIG. 2, the first substrate and the second substrate extend across a plurality of display elements, for example all display elements of the array. Hence, as shown with FIG. 2, the first display element is associated with a first portion of the first substrate, the second display element is associated with a second portion of the first substrate, and the third display element is associated with a third portion of the first substrate, where none of the first, second and third portions overlap each other. Similarly, the first, second and third display elements are associated with respective portions of the second substrate.

Where the composition of the first substrate is the same across all display elements, and the second substrate has the same composition across all display elements, the first and second substrates are each substantially transmissive to light of the first wavelength, at least so that light from the light source can be transmitted to the first photoluminescent material and so that light from the light source can be transmitted to the second photoluminescent material, and indeed so that in appropriate examples light from the light source may be transmitted to the viewing side for the third display element. For example the first and/or second substrate may be transmissive to greater than 90% of input light they receive.

The first substrate may further be substantially transmissive to light output by the second photoluminescent material, so that light may reach the viewing side for the second display element.

By being substantially transmissive, a substrate may absorb some light input to the substrate, but of a sufficiently insignificant amount so as not to negatively affect the amount of light output by the substrate to the extent where performance of the display device is compromised.

In some examples, such as those illustrated with FIG. 2, there is a plurality of light valves 26, for example with each display element comprising one such light valve. For example, the first display element 2A comprises a first light valve 26A, the second display element 2B comprises a second light valve 26B, and the third display element 2C comprises a third light valve 26C. In the examples of FIG. 2, the first substrate is partly located between the second photoluminescent material and the second light valve.

As the skilled person will appreciate, a light valve may be considered a structure which is used to control an amount of light transmitted between an input side of the light valve and an output side of the light valve. Such a light valve may for example comprise a liquid crystal material with a controllable orientation for increasing or decreasing the transmission of polarised light through the light valve. Examples of a plurality of light valves using a liquid crystal are described later. In other examples it is to be appreciated that a different type of light valve may be used, for example a micromechanical system (MEMs) based light valve, or another type of light valve which the skilled person will be aware of.

In some examples, such as those illustrated with FIG. 2, the display device comprises a plurality of colour filters 28 with for example one colour filter per display element. Each colour filter may comprise an appropriate colour filtering material which absorbs input light, transmits a portion of that light with a desired wavelength or wavelengths through the colour filtering material, and then outputs that portion of light from the colour filtering material. The input light which is not transmitted and output is instead absorbed and therefore blocked by the colour filtering material. Hence, with an appropriate colour filtering material, light of a different desired wavelength or wavelengths may be output by the appropriate display element. In the examples of FIG. 2, the first display element comprises a first colour filter 28A, the second display element comprises a second colour filter 28B, and the third display element comprises a third colour filter 28C. The colour filters may be used to remove any light of the wavelength(s) output by the light source which has not been absorbed by the photoluminescent material of the corresponding display element, and/or to tune, for example restrict the wavelength(s) of light output by a photoluminescent material compared with the wavelength(s) of light desired to be output by a display element.

In the examples of FIG. 2, the same light source is used for all display elements. Therefore, light of a first wavelength is output by the light source. For the first display element 2A, this light is transmitted through the second substrate 20, through the transmissive material 22, through the first substrate 10, and is received by the first photoluminescent material 16. The first photoluminescent material 16 outputs light of a second wavelength in response to receipt of light of the first wavelength. This light is then transmitted through the first light valve 26A, and then in turn through the first colour filter 28A, to be output at the viewing side 8.

For the second display element 2B, the light output by the light source is transmitted through the second substrate 20, and is received by the second photoluminescent material 18. The second luminescent material 18 outputs light of a third wavelength in response to receipt of light of the first wavelength. This light is then transmitted through the first substrate 10, through the transmissive material 24, through the second light valve 26B, and then in turn through the second colour filter 28B, to be output at the viewing side 8.

For the third display element 2C, the light output by the light source is transmitted through the second substrate 20, through the transmissive material 25, through the first substrate 10, through further of the transmissive material 25, through the third light valve 26C, and then in turn through the third colour filter, to be output at the viewing side 8.

In the examples described, the first display element outputs green light, the second display element outputs red light, and the third display element outputs blue light. The colour filters 28 are configured appropriately, so that for example the first colour filter is a green colour filter, the second colour filter is a red colour filter, and the third colour filter is a blue colour filter.

Further, the light source is configured to output light with the appropriate first wavelength, and the first and second photoluminescent materials are selected to output the appropriate second and third wavelengths.

For example, the first light source is configured to output light of a wavelength in the range 440 to 475 nano-metres (nm), for example blue light. The first wavelength may therefore be any wavelength in this range. The first photoluminescent material for example outputs light in the range 500 to 560 nano-metres (nm), for example green light, in response to receipt of light of the first wavelength, and therefore the second wavelength may be any wavelength in the range 500 to 560 nm. The second photoluminescent material for example outputs light in the range 615 to 640 nano-metres (nm), for example red light, in response to receipt of light of the first wavelength, and therefore the third wavelength may be any wavelength in the range 615 to 640 nm. In other examples, and depending on the particular photoluminescent material used, the light of the second wavelength may instead be red light and the light of the third wavelength may instead be green light.

A difference in the brightness of light output by different photoluminescent materials may be compensated for by using different thicknesses of the photoluminescent materials. For example, a thinner layer of photoluminescent material may be used for a photoluminescent material which emits light of a greater brightness than a different photoluminescent material. Further, or alternatively, where light valves are used, a different light transmissivity may be selected for different light valves, to output light of the same brightness where the brightness of the input light from the corresponding photoluminescent material is different.

Figure 3:
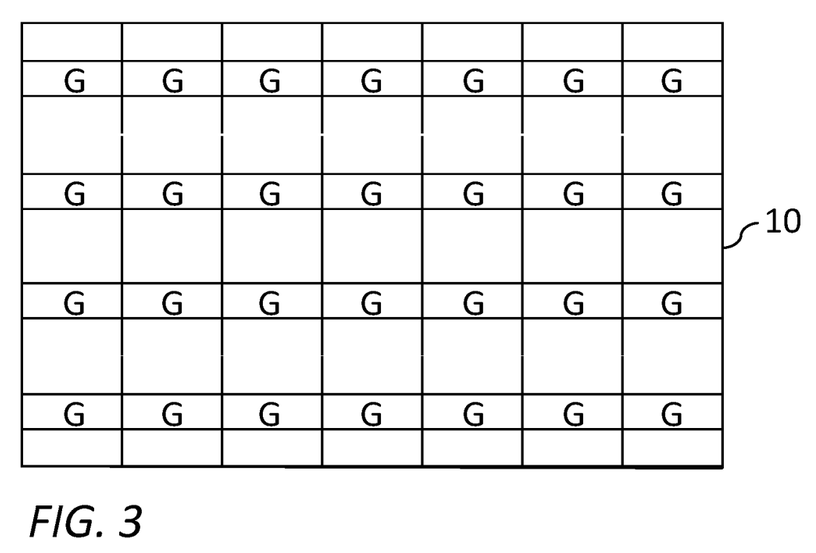
FIG. 3 shows schematically a plan view of a pattern of first photoluminescent material, according to examples.

Referring now to FIG. 3, there is shown in plan view the first substrate 10 of examples described using FIG. 2, with a pattern of the first photoluminescent material 16 located thereon. The pattern includes a portion, for example a layer or droplet, of the first photoluminescent material located for each of the display elements associated with the first photoluminescent material. Therefore, as shown, the pattern may comprise regions such as bands or stripes of the first photoluminescent material, with an absence of photoluminescent material and any other material (such as a colour filter) which may modify a colour of light between adjacent regions.

Figure 4:
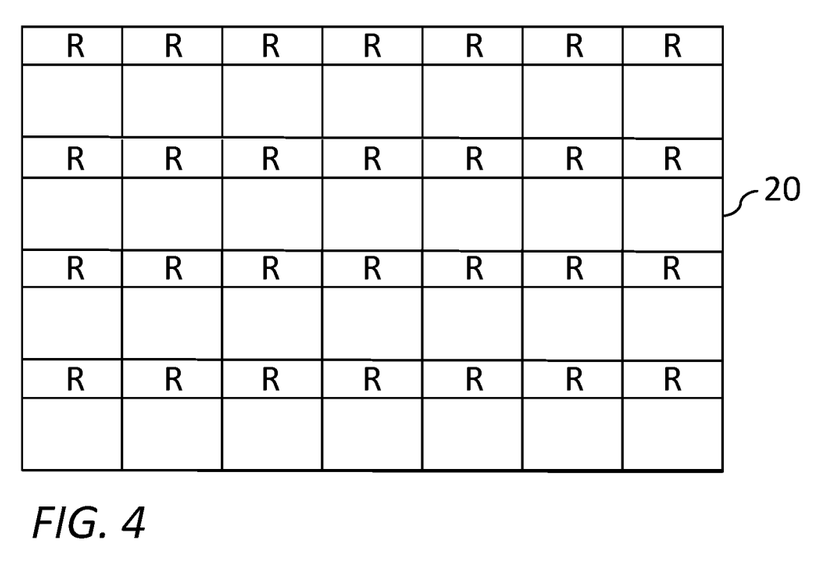
FIG. 4 shows schematically a plan view of a pattern of second photoluminescent material according to examples.

Referring now to FIG. 4, there is shown in plan view the second substrate 20 of examples of FIG. 2, with a pattern of the second photoluminescent material 18 located thereon. Similar to the first photoluminescent material, the pattern of the second photoluminescent material includes a portion of the second photoluminescent material located for each of the display elements associated with the second photoluminescent material.

When the first and second substrates are stacked, with the first substrate on the second photoluminescent material on the second substrate, the substrates are aligned with each other, for example laterally, such that the first photoluminescent material and the second photoluminescent material are for example substantially non-overlapping each other.

The patterns of the first and second photoluminescent materials of these examples are such that with the substrates stacked, there is a region corresponding with the third display elements and further display elements with an absence of photoluminescent material.

Further examples will now be described with reference to FIG. 5. Features similar to those already described are labelled with the same reference numerals incremented by 100; corresponding descriptions apply and are not repeated again here for conciseness.

Figure 5:
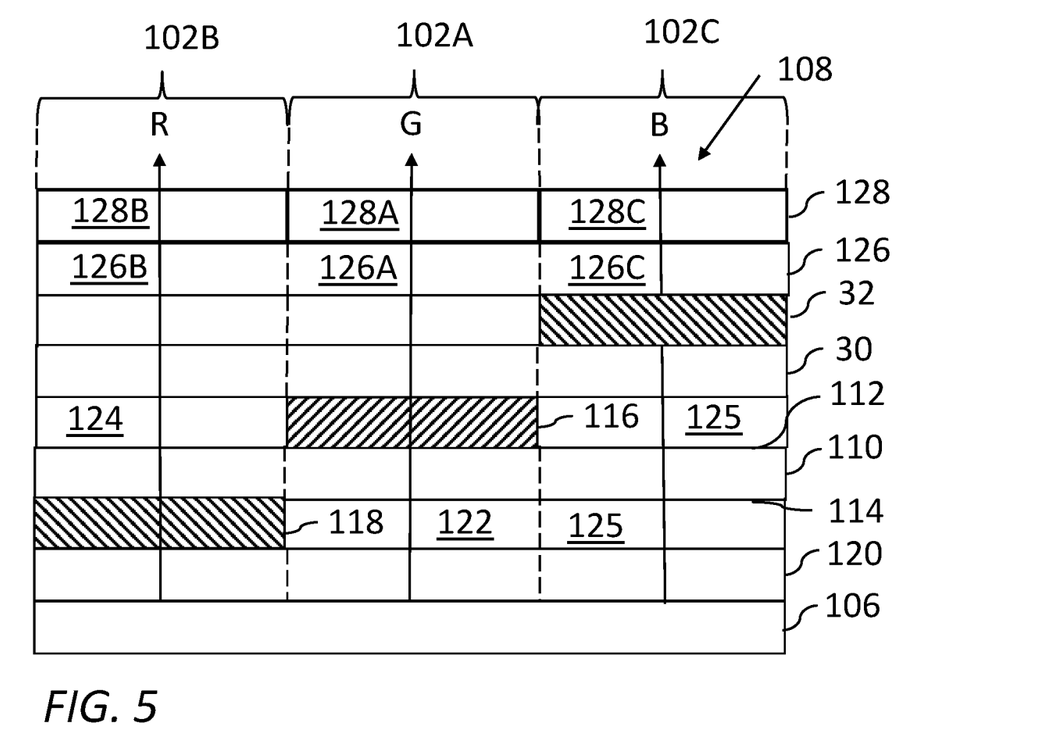
FIG. 5 shows a cross-section of three display elements, according to further examples.

In examples according to FIG. 5, the display device comprises a third substrate 30 between the first photoluminescent material 116 and the viewing side 108. A third photoluminescent material 32 is located on the third substrate, for example in contact with a side of the third substrate closer to the viewing side 108. An opposite side of the third substrate is in these examples in contact with the first photoluminescent material.

The third substrate is similar to the first and/or second substrate, and may extend across all display elements. Hence the third substrate may be transmissive to light of the first, second and third wavelengths.

For the third display element 102C, instead of there being substantially an absence of photoluminescent material, the third photoluminescent material is associated with the third display element in a similar way that the first photoluminescent material is associated with the first display element, for example. The third photoluminescent material is configured to, in response to receipt of light of the first wavelength from the light source, output light of a fourth wavelength. This light of the fourth wavelength may then be transmitted on to the viewing side, for example via the third light valve 126C and the third colour filter 128C. The third photoluminescent material may output light in the range 440 to 475 nano-metres in response to receipt of light of the first wavelength. The fourth wavelength may therefore be any wavelength in the range 440 to 475 nm. In such examples, the light of the first wavelength may instead be in the ultraviolet (UV) range, for example in the range 10 to 400 nano-metres (nm), for example in the range 315 to 400 nm.

In such examples described using FIG. 5, the third substrate may be patterned with portions of the third photoluminescent material, with a similar pattern as shown for the first and second photoluminescent materials described with FIGS. 3 and 4. Thus, when manufacturing the display device, the first, second and third substrates may be stacked and aligned with each other, to give the pattern of display elements shown with FIG. 1.

Although examples are given with the first, second and third display elements outputting green, red and blue light, respectively, it is envisaged in further examples that any display element may be configured to output a different colour of light, for example yellow, magenta, cyan, red, green or blue. Further, there may be more than or fewer than three display elements per pixel. Specific designs may be simply manufactured, for example by manufacturing separate substrates each with a different photoluminescent material patterned thereon, for a plurality of display elements, and then stacking the substrates with appropriate alignment. This gives a simpler approach to design and manufacture than a single substrate with patterns of different photoluminescent materials deposited thereon.

Figure 6:
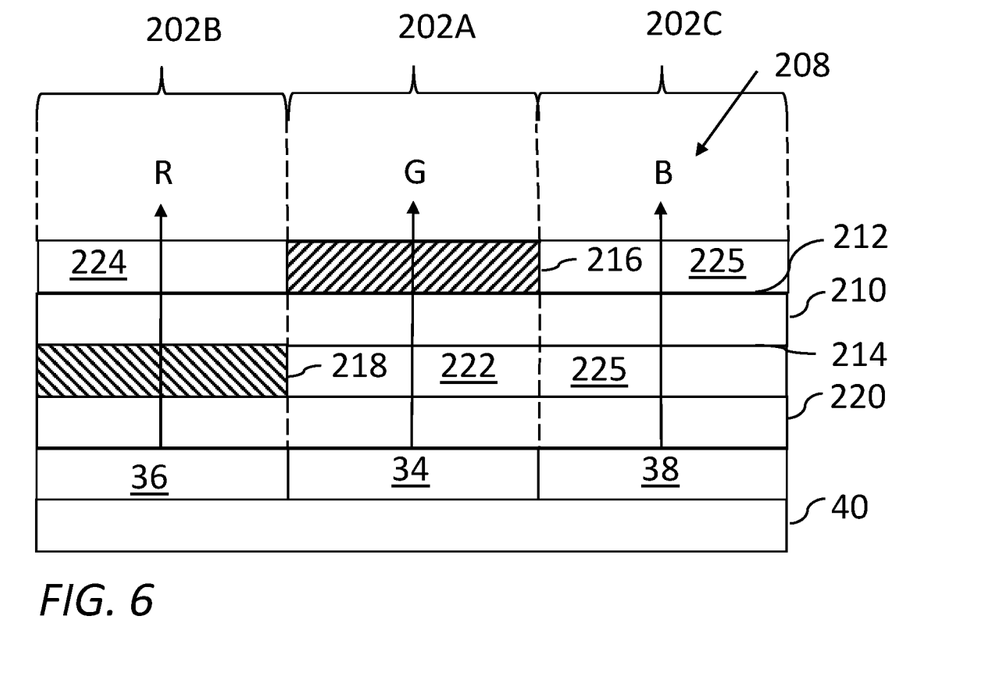
FIG. 6 shows a cross-section of three display elements, according to yet further examples.

Further examples are envisaged in accordance with FIG. 6. Features similar to those already described are labelled with the same reference numerals incremented by 200; corresponding descriptions apply and are not repeated again here for conciseness.

In such examples, the display device comprises a plurality of light sources, for example a first light source 34 associated with the first display element, a second light source 36 associated with the second display element, and in some examples a third light source 38 associated with the third display element. By being associated with a display element, a light source is for example configured to emit the majority, for example 50% or more, of light towards the viewing side and substantially within the lateral extent of that display element. Hence, although some light output by the light source may pass outside the lateral extent of the display element, this is sufficiently negligible for correct operation of the device.

Each light source may be configured to output light of the same wavelength or within the same range of wavelengths, similarly to the light source 6 described previously. In other examples, at least two of the light sources may be configured to output light of a different wavelength or wavelengths from each other, for example in different ranges, for example in accordance with a particular photoluminescent material of the associated display element. This choice of different light source output may be used to obtain a desired colour gamut for the display device. For example, for one display element and one photoluminescent material the light source may output blue light, whereas for another display element and another photoluminescent material the light source may output light of a different wavelength than for example the first wavelength, such as ultraviolet light.

Each light source may be independently controllable with appropriate circuitry to control a voltage magnitude applied to each light source, and in turn control a brightness of light output by each light source. Such a light source may comprise an organic light emitting diode (OLED) or a so-called micro-LED. These may be mounted on a substrate 40. As the brightness of light output by the light source in such examples can be controlled on an individual display element basis, rather than one light source for more than one display element, there may be no need for any light valves to control the amount of light transmitted from the light source to the viewing side, as the colour and brightness of light for each display element can be controlled using the light sources and any associated photoluminescent material. Hence, as illustrated in FIG. 6, compared with the examples of FIGS. 2 and 5, there is no plurality of light valves. Further, there may be no need for any colour filters, such as those illustrated in FIG. 2.

Figure 7:
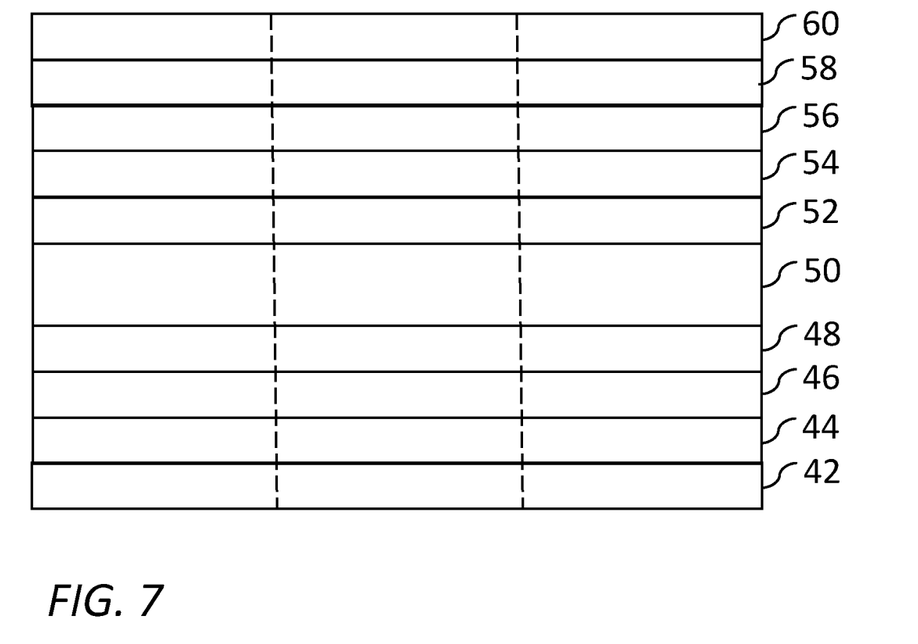
FIG. 7 shows a cross-section of three light valves using a liquid crystal, according to examples.

FIG. 7 illustrates schematically and in cross-section parts of a plurality of light valves which use a liquid crystal material, according to examples. The plurality of light valves is illustrated for use in the first, second and third display elements 2A, 2B, 2C of the display device of FIG. 2, but it is to be appreciated that the plurality of light valves may have one light valve for each display element of the array of display elements. Working from the bottom to top of the Figure, there is a polariser 42, a substrate 44, control circuitry 46, a plurality of electrodes 48 (for example a patterned film of indium tin oxide (ITO) with one electrode per light valve), an orientation film 50, a liquid crystal material 52, an orientation film 54, a plurality of electrodes 56 (for example another patterned ITO film with one electrode per light valve), a substrate 58, and a polariser 60. Using the control circuitry, a voltage may be applied between an electrode 48 and electrode 56, the pair of electrodes corresponding to one light valve, and the orientation of the liquid crystal may be controlled to determine the amount of light transmitted through that light valve. The skilled person will readily appreciate further details of such a light valve using a liquid crystal, and for conciseness these will not be elaborated on here.

A display device such as that of FIG. 2 may be manufactured using a method including: depositing the first photoluminescent material on the first substrate, in accordance with a first pattern; depositing the second photoluminescent material on the second substrate, in accordance with a second pattern; and then attaching the first substrate to the second photoluminescent material with the first pattern and the second pattern aligned with each other. If a transmissive material is to be used on a substrate where photoluminescent material is not present, the transmissive material may be deposited on the appropriate substrate after the photoluminescent material has been deposited, and before the substrates are stacked.

Depositing the photoluminescent materials and transmissive materials on a substrate may be performed using a conventional technique, for example photolithography which the skilled person is familiar with. If the photoluminescent material comprises a quantum dot material, any of the following techniques may be used: electron beam lithography, a pulsed laser ablation technique, inkjet printing, a pulsed spray technique, or a transfer printing technique, which the skilled person will be familiar with.

Any of the substrates described may for example comprise or be formed of polyethylene terephthalate (PET) or polyethylene naphthalate (PEN).

Examples of a photoluminescent material which may be used in examples described herein include a phosphor type material, for example YAG:Ce (for example $Y_3Al_5O_{12}$:Ce), LSN (for example $La_3Si_6N_n$:Ce), CASN (for example $CaAlSiN_3$:Eu), SCASN (for example $SrAlSiN_3$:Eu), and AlSiON:Eu.

Other examples of a photoluminescent material which may be used in examples described herein include a so-called quantum dot type material, nanoplatelets, nanowires or nanorods. Examples of a quantum dot type material include CdSe, ZnS, CdTe, CdSe/ZnS core/shell, InZnP/ZnS core/shell, InP/ZnS core/shell, and CdZnS/ZnS core/shell type quantum dots.

In the previous paragraphs, Y is yttrium, Al is aluminium, O is oxygen, Ce is cerium, La is lanthanum, Si is silicon, N is nitrogen, Ca is calcium, Sr is strontium, Eu is europium, Cd is cadmium, Se is selenium, Zn is zinc, S is sulphur, Te is tellurium, In is indium, and P is phosphorus. n indicates a number of atoms present in a given chemical formula, as the skilled person will appreciate.

Examples of the transmissive material, which may also be used in a region where a quantum dot material is to be used (to encapsulate the quantum dot material), include for example a suitable silicone encapsulant material which the skilled person will be familiar with. In other examples, a quantum dot material may be encapsulated in for example a poly(methyl methacylate) (PMMA) or SU-8 negative epoxy photoresist material; in such examples a surface of colloidal quantum dots may be coated with silica.

Any such transmissive material may also be used to attach the underside of one substrate to an upper surface of a photoluminescent material, for example the underside of the first substrate to an upper side of the second photoluminescent material.

In aligning the pattern of one photoluminescent material with the pattern of a different photoluminescent material, known alignment techniques and apparatus may be used. For example, each pattern of photoluminescent material and/or the substrate on which it is deposited may include one or more alignment marks which are precisely located, and then aligned relative to each other when applying one substrate on another.

It is to be appreciated that there may be further parts of a display device described which are not described or illustrated herein. For example, there may be touch detection apparatus located on the plurality of light valves, or where there are multiple light sources, directly on a stack of substrates with photoluminescent material deposited thereon. Such a touch detection apparatus may be aligned with the display elements such that a user can interact with the display device by touch, as the skilled person will appreciate. There may also be other structures, for example one or more protective layers, structural support layers or structures, and optical layers such as a diffuser layer. Details are not elaborated here, as the choice of any such structures depends on the particular display device design in question, and which the skilled person will be familiar with.

There may be appropriate control circuitry for powering and controlling operation of one or more of the light sources. Where there is a plurality of light sources, such as OLEDs or micro-LEDs, a so-called active matrix (AM) circuitry may be used to control the light sources. As the skilled person appreciates, such circuitry may use thin film transistors (TFTs) to control when and of what magnitude a voltage is applied to each light source. Similarly, where light valves are used, appropriate circuitry, such as active matrix circuitry, may be used to control operation of each light valve, for example a magnitude of voltage applied to determine and control a transmissivity of the light valve for light. For example, a transmissivity of the first light valve to light output by the first photoluminescent material, and a transmissivity of the second light valve to light output by the second photoluminescent material may be controlled. Each display element may have associated with it one or more storage capacitors to maintain an applied voltage magnitude.

Figure 8:
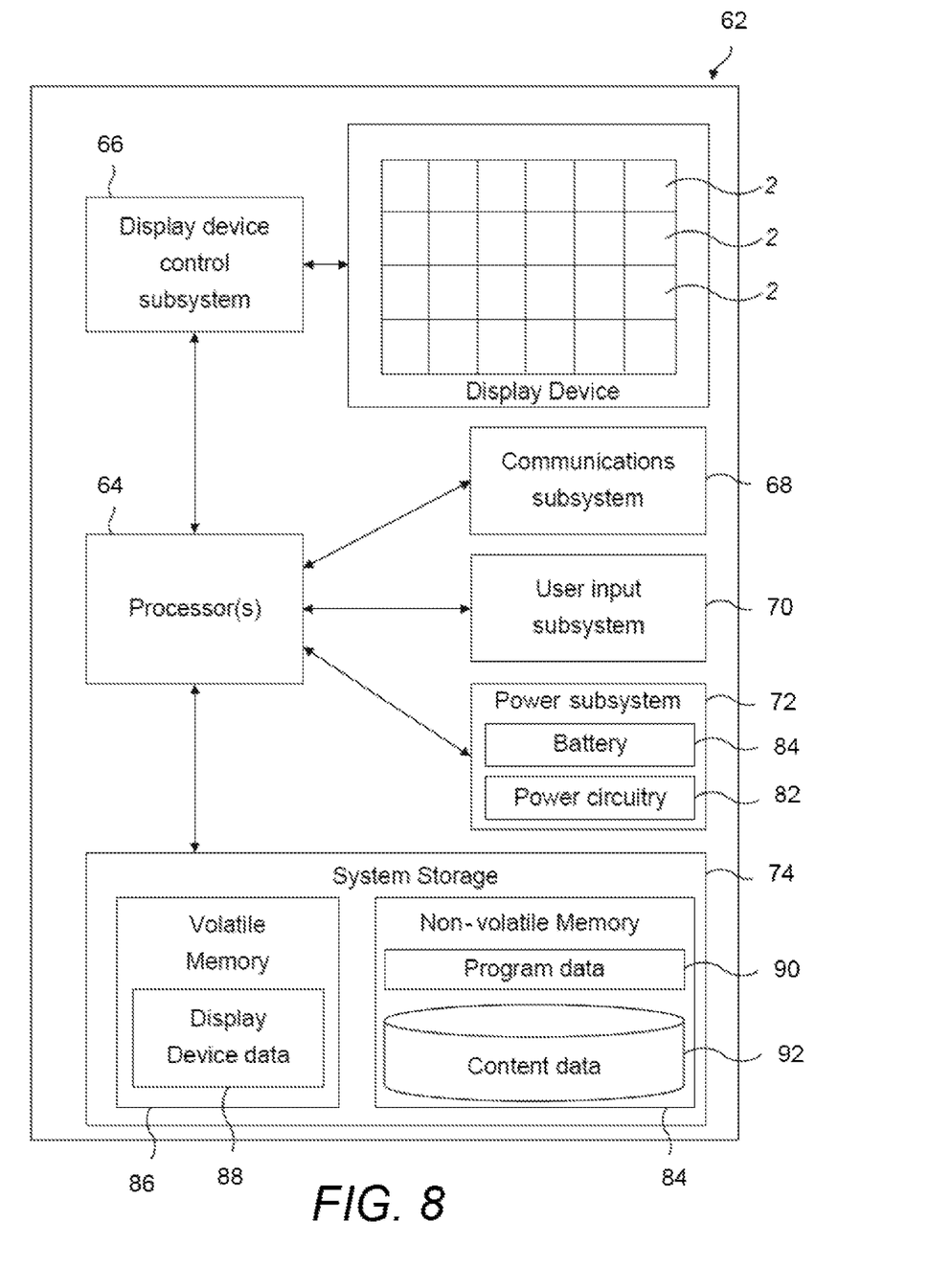
FIG. 8 shows schematically apparatus which may use the display device, according to examples.

FIG. 8 shows schematically a system diagram of an example system, for example an apparatus 62, including a display device in accordance with examples described earlier. The apparatus is for example a television or a monitor, or a display screen for installation in any machine requiring a display screen, such as a consumer appliance. Instead the apparatus may be a more portable, for example mobile, device such as an electronic reader device such as a so-called e-reader, a tablet computing device, a laptop computing device, a mobile telecommunications device, a watch or a satellite navigation device.

The system diagram illustrates an example of a basic hardware architecture of the apparatus 62. The apparatus 62 includes at least one processor 64 connected to and therefore in data communication with for example: a display device control subsystem 66 (which for example may be or include circuitry for controlling the display device, for example a plurality of light valves and/or one or more light source described earlier), a communications subsystem 68, a user input subsystem 70, a power subsystem 72 and system storage 74. The display device control subsystem is connected to and may therefore electrically communicate with circuitry of the display device. The at least one processor 64 is for example a general purpose processor, a microprocessor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The processor may be coupled, via one or more buses, to read information from or write information to one or more memories, for example those of the system storage 74. The at least one processor may additionally, or in the alternative, contain memory, such as processor registers.

The display device control subsystem 66 for example includes driver components, for use in applying a voltage to any of the display elements, to address for example a light source and/or light valve of different display elements. In examples the display elements are configured according to an active matrix configuration and the display device control subsystem is configured to control switching elements such as thin film transistors (TFTs) to control the display elements.

The communications subsystem 68 for example is configured for the apparatus to communicate with for example a computing device via a data network, for example a computer network such as the Internet, a local area network, a wide area network, a telecommunications network, a wired network, a wireless network, or some other type of network. The communications subsystem 68 may further for example include an input/output (I/O) interface, such as a universal serial bus (USB) connection, a Bluetooth or infrared connection, or a data network interface for connecting the apparatus to a data network such as any of those described above. Content data as described later may be transferred to the apparatus via the communications subsystem.

The user input subsystem 70 may include for example an input device for receiving input from a user of the apparatus. Example input devices include, but are not limited to, a keyboard, a rollerball, buttons, keys, switches, a pointing device, a mouse, a joystick, a remote control, an infrared detector, a voice recognition system, a bar code reader, a scanner, a video camera (possibly coupled with video processing software to, e.g., detect hand gestures or facial gestures), a motion detector, a microphone (possibly coupled to audio processing software to, e.g., detect voice commands), or other device capable of transmitting information from a user to the device. The input device may also take the form of a touch-screen associated with the display device, in which case a user responds to prompts on the display device by touch. The user may enter textual information through the input device such as the keyboard or the touch-screen.

The apparatus may also include a user output subsystem (not illustrated) including for example an output device for providing output to a user of the apparatus. Examples include, but are not limited to, a printing device, an audio output device including for example one or more speakers, headphones, earphones, alarms, or haptic output devices. The output device may be a connector port for connecting to one of the other output devices described, such as earphones.

The power subsystem 72 for example includes power circuitry 82 for use in transferring and controlling power consumed by the apparatus. The power may be provided by a mains electricity supply or from a battery 84, via the power circuitry. The power circuitry may further be used for charging the battery from a mains electricity supply.

The system storage 74 includes at least one memory, for example at least one of volatile memory 86 and non-volatile memory 84 and may include a non-transitory computer readable storage medium. The volatile memory may for example be a Random Access Memory (RAM). The non-volatile (NV) memory may for example be a solid state drive (SSD) such as Flash memory, or Read Only Memory (ROM). Further storage technologies may be used, for example magnetic, optical or tape media, compact disc (CD), digital versatile disc (DVD), Blu-ray or other data storage media. The volatile and/or non-volatile memory may be removable or non-removable.

Any of the memories may store data for controlling the apparatus, for example components or subsystems of the apparatus. Such data may for example be in the form of computer readable and/or executable instructions, for example computer program instructions. Therefore, the at least one memory and the computer program instructions may be configured to, with the at least one processor, control a display effect provided by a display element. For example, an amount of light of the first wavelength output by the light source, or an amount of light output by each different light source may be controllable. Further, where the display device comprises a plurality of light valves, a transmissivity of the first light valve to light output by the first photoluminescent material, and a transmissivity of the second light valve to light output by the second photoluminescent material, are controllable.

In the example of FIG. 8, the volatile memory 86 stores for example display device data 88 which is indicative of display effects to be provided by the display elements. The at least one processor 64 may transmit data, based on the display device data, to the display device control subsystem 66 which in turn outputs signals to the display device for applying voltages to the display elements, for providing a desired image from the display device.

The non-volatile memory 84 stores for example program data 90 and/or content data 92. The program data 90 is for example data representing computer executable instructions, for example in the form of computer software, for the apparatus to run applications or program modules for the apparatus or components or subsystems of the apparatus to perform certain functions or tasks, and/or for controlling components or subsystems of the apparatus. For example, application or program module data includes any of routines, programs, objects, components, data structures or similar. The content data 92 is for example data representing content for example for a user; such content may represent any form of media, for example text, at least one image or a part thereof, at least one video or a part thereof, at least one sound or music or a part thereof. Data representing an image or a part thereof is for example representative of a display effect to be provided by at least one display element of the display device. The content data may include data representing content, for example any of books, periodicals, newspapers, movies, videos, music, or podcasts, each of which may be represented by a collection of data which represents for example one book or one movie. Such a collection of data may include content data of one type, but may instead include a mixture of content data of different types, for example a movie may be represented by data including at least image data and sound data.

The above examples are to be understood as illustrative. Further examples are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A display device comprising:
   a light source configured to output light of a first wavelength;
   a plurality of display elements comprising a first display element and a second display element;
   a first substrate having a first side and a second side, the second side closer to the light source than the first side;
   a first photoluminescent material associated with the first display element and located at the first side of the first substrate; and
   a second photoluminescent material associated with the second display element and located at the second side of the first substrate.

2. The display device of claim 1, wherein the first photoluminescent material and the second photoluminescent material are substantially non-overlapping with each other.

3. The display device of claim 1, the first photoluminescent material in contact with the first side of the first substrate, the display device comprising a second substrate, the second photoluminescent material in contact with the second substrate and located between the second substrate and the first substrate.

4. The display device of claim 1, wherein the first substrate is substantially transmissive to light of the first wavelength.

5. The display device of claim 1, the plurality of display elements comprising a third display element,
   the first display element associated with a first portion of the first substrate,
   the second display element associated with a second portion of the first substrate, and
   the third display element associated with a third portion of the first substrate.

6. The display device of claim 5, the third display element comprising an absence of photoluminescent material.

7. The display device of claim 1,
   the first display element comprising an absence of photoluminescent material at the second side of the first substrate, and
   the second display element comprising an absence of photoluminescent material at the first side of the first substrate.

8. The display device of claim 1, wherein:
   the first photoluminescent material outputs light of a second wavelength in response to receipt of light of the first wavelength, and
   the second photoluminescent material outputs light of a third wavelength in response to receipt of light of the first wavelength.

9. The display device of claim 8, wherein the light of the first wavelength is blue light, the light of the second wavelength is green light, and the light of the third wavelength is red light.

10. The display device of claim 8, the first substrate substantially transmissive to light of the second wavelength.

11. The display device of claim 1, wherein the light source is a first light source associated with the first display element, the display device comprising a second light source associated with the second display element.

12. The display device of claim 11, wherein the second light source is configured to output light of the first wavelength or light of a different wavelength than the first wavelength.

13. The display device of claim 1, comprising a plurality of light valves, the first display element comprising a first light valve of the plurality of light valves, and the second display element comprising a second light valve of the plurality of light valves, the first substrate partly located between the second photoluminescent material and the second light valve.

14. An apparatus comprising:
a display device comprising:
   a light source configured to output light of a first wavelength;
   a plurality of display elements comprising a first display element and a second display element;
   a first substrate having a first side and a second side, the second side closer to the light source than the first side;
   a first photoluminescent material associated with the first display element and located at the first side of the first substrate; and
   a second photoluminescent material associated with the second display element and located at the second side of the first substrate;
at least one processor; and
at least one memory comprising computer program instructions, the at least one memory and the computer program instructions operable to, with the at least one processor:
   control an amount of light of the first wavelength output by the light source.

15. The apparatus of claim 14, the display device comprising a plurality of light valves, the first display element comprising a first light valve of the plurality of light valves, and the second display element comprising a second light valve of the plurality of light valves, the first substrate partly located between the second photoluminescent material and the second light valve, and the at least one memory and the computer program instructions operable to, with the at least one processor:
   control a transmissivity of the first light valve to light output by the first photoluminescent material; and
   control a transmissivity of the second light valve to light output by the second photoluminescent material.

16. The apparatus of claim 14, wherein the first photoluminescent material and the second photoluminescent material are substantially non-overlapping with each other.

17. The apparatus of claim 14, the first photoluminescent material in contact with the first side of the first substrate, the display device comprising a second substrate, the second photoluminescent material in contact with the second substrate and located between the second substrate and the first substrate.

18. The apparatus of claim 14, wherein the first substrate is substantially transmissive to light of the first wavelength.

19. The apparatus of claim 14,
the first display element comprising an absence of photoluminescent material at the second side of the first substrate, and
the second display element comprising an absence of photoluminescent material at the first side of the first substrate.

20. The apparatus of claim 14,
wherein the first photoluminescent material outputs light of a second wavelength in response to receipt of light of the first wavelength, and
the second photoluminescent material outputs light of a third wavelength in response to receipt of light of the first wavelength.

* * * * *